(12) United States Patent
Kawate

(10) Patent No.: US 8,442,488 B2
(45) Date of Patent: May 14, 2013

(54) PORTABLE COMMUNICATION TERMINAL AND USE-ENABLED/DISABLED CONTROL METHOD

(75) Inventor: Takashi Kawate, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 502 days.

(21) Appl. No.: 12/602,417

(22) PCT Filed: May 30, 2008

(86) PCT No.: PCT/JP2008/060063
§ 371 (c)(1),
(2), (4) Date: Feb. 17, 2010

(87) PCT Pub. No.: WO2008/149816
PCT Pub. Date: Dec. 11, 2008

(65) Prior Publication Data
US 2010/0186081 A1    Jul. 22, 2010

(30) Foreign Application Priority Data

May 30, 2007    (JP) ................................. 2007-144206

(51) Int. Cl.
*H04M 1/66* (2006.01)
*H04M 3/00* (2006.01)

(52) U.S. Cl.
USPC ......................................... 455/410; 455/418

(58) Field of Classification Search .................. None
See application file for complete search history.

(56) References Cited

U.S. PATENT DOCUMENTS

| | | | | |
|---|---|---|---|---|
| 5,749,004 A | * | 5/1998 | Yasukawa | 396/280 |
| 2003/0122671 A1 | * | 7/2003 | Jespersen | 340/568.1 |
| 2006/0046704 A1 | * | 3/2006 | Hori et al. | 455/418 |
| 2007/0032228 A1 | * | 2/2007 | Varanda | 455/418 |
| 2007/0064514 A1 | * | 3/2007 | Miyamoto et al. | 365/228 |

FOREIGN PATENT DOCUMENTS

| | | |
|---|---|---|
| JP | 08-129512 | 5/1996 |
| JP | 2001-223631 | 8/2001 |
| JP | 2003-150449 A | 5/2003 |
| JP | 2005-301489 A | 10/2005 |
| JP | 2006-054581 | 2/2006 |
| JP | 2006-086738 | 3/2006 |
| JP | 2006-209453 * | 8/2006 |
| JP | 2006-253878 | 9/2006 |
| JP | 2007-087118 | 4/2007 |
| JP | 2007-122457 A | 5/2007 |

OTHER PUBLICATIONS

Notice of Reasons for Rejection dated May 8, 2012, issued in counterpart Japanese Application No. 2009-517849.
Notice of Reasons for Rejection dated Jan. 15, 2013, issued in counterpart Japanese Application No. 2009-517849.

* cited by examiner

*Primary Examiner* — Erika A Washington
(74) *Attorney, Agent, or Firm* — Procopio, Cory, Hargreaves & Savitch LLP

(57) ABSTRACT

To provide a portable communication terminal which can improve security. A mobile telephone device (1) includes: a RFID chip (52) which performs magnetic field communication based on a signal coming from outside; a NAND flash memory (73) which stores use-enabled/disabled information indicating whether the RFID chip (52) can be used; and a CPU (72) which updates the use-enabled/disabled information. When a signal comes from outside, the RFID chip (52) judges whether to perform a predetermined process according to predetermined information based on the use-enabled/disabled information stored in the NAND flash memory (73).

12 Claims, 5 Drawing Sheets

PORTABLE COMMUNICATION TERMINAL AND USE-ENABLED/DISABLED CONTROL METHOD

TECHNICAL FIELD

The present invention relates to a portable communication device for communicating with other terminals, and to a use-enabled/disabled control method.

BACKGROUND ART

In recent years, information to be accumulated in a portable terminal device is diversified, and an improvement has been demanded in security performance for operations by a person other than the user.

Accordingly, a variety of security mechanisms have been proposed for inactivating a key operation of a portable terminal device (for example, see Patent Document 1).

Moreover, recently, for improved functionality, portable terminal devices provided with a communicating means built into a body thereof, for communication with external devices by way of RFID (Radio Frequency Identification), which is a contactless IC (Integrated Circuit) chip, and the like, are becoming common.

For example, in Patent Document 1, a technique is proposed in which a user's operation pattern is registered in advance, and when operation keys are operated with a pattern that is not the registered operation pattern, the operation keys are automatically locked, thereby improving security performance regarding activation of application programs that are activated when using a contactless IC chip. However, it has not been perfected yet.

Patent Publication 1: Japanese Unexamined Patent Application, First Publication No. 2006-54581

DISCLOSURE OF THE INVENTION

Problems to be Solved by the Invention

Accordingly, an objective of the present invention is to provide a portable communication terminal and a use-enabled/disabled control method, which can further improve security performance.

Means for Solving the Problems

In order to solve the abovementioned problem, a portable communication terminal according to the present invention includes: a processing unit that performs magnetic field communication based on a signal arriving externally; a nonvolatile memory unit that stores use-enabled/disabled information indicating whether use of the processing unit is enabled; and a control unit that performs updating of the use-enabled/disabled information, in which, when a signal arrives externally, the processing unit determines whether to perform predetermined processing, according to predetermined information based on the use-enabled/disabled information stored in the nonvolatile memory unit.

Moreover, it is preferable that the portable communication terminal further includes an information storage unit of volatile type that stores information that is the same as the use-enabled/disabled information stored in the nonvolatile memory unit, and it is preferable that the predetermined information is the use-enabled/disabled information stored in the information storage unit.

In addition, in the portable communication terminal, when a request to change whether to enable use of the processing unit is performed, it is preferable that the control unit updates both the use-enabled/disabled information stored in the information storage unit and the use-enabled/disabled information stored in the nonvolatile memory unit to a new setting.

Furthermore, in the portable communication terminal, in a case of a reset occurring, it is preferable that the control unit copies the use-enabled/disabled information, which is stored in the nonvolatile memory unit, into the information storage unit.

Moreover, it is preferable that the portable communication terminal further includes a magnetic field antenna for performing magnetic field communication that is connected to the processing unit, and when receiving predetermined electromagnetic waves, it is preferable that the magnetic field antenna generates an induced electromotive force that serves as a trigger to start the processing unit.

In addition, in the portable communication terminal, it is preferable that the processing unit performs settlement processing of electronic money by way of magnetic field communication.

Furthermore, it is preferable that the portable communication terminal further includes a battery that supplies driving electric power to each of the processing unit and the control unit, and it is preferable that the driving electric power can be supplied from the battery to the processing unit even if the power supply to the control unit is turned off.

Moreover, in the portable communication terminal, when the power supply transitions from being turned off to being turned on, it is preferable that the control unit copies the use-enabled/disabled information, which is stored in the nonvolatile memory unit, into the information storage unit.

In addition, it is preferable that the portable communication terminal further includes: a first substrate on which the control unit is mounted; and a second substrate on which the processing unit is mounted.

Furthermore, in the portable communication terminal, it is preferable that the nonvolatile memory unit includes a first memory and a second memory, the first memory is disposed on the first substrate, and the second memory is disposed on the second substrate.

Moreover, in the portable communication terminal, when a request to change whether to enable use of the processing unit is performed, it is preferable that the control unit updates the use-enabled/disabled information stored in the first memory, the second memory, and the information storage unit, respectively, and in a case of a reset occurring, it is preferable that the control unit copies the use-enabled/disabled information stored in the first memory into the second memory and the information storage unit, respectively.

In addition, it is preferable that the portable communication terminal further includes a magnetic field antenna for performing magnetic field communication that is connected to the processing unit, in which adjustment parameters of the magnetic field antenna are further stored in the first memory, and when a request to change whether to enable use of the processing unit is performed, the control unit updates the use-enabled/disabled information stored in the first memory, and reads the use-enabled/disabled information updated in the first memory and the adjustment parameters, and writes both into the second memory.

In order to solve the abovementioned problem, a method for use-enabled/disabled control in a portable communication terminal according to the present invention is a use-enabled/disabled control method in a portable communication terminal that includes a processing unit performing magnetic field communication, and the method includes the steps of: designating whether to enable use of the processing unit; storing, in a nonvolatile memory unit, use-enabled/disabled information indicating whether use of the processing unit is enabled, based on the step of designating; referring to predetermined information based on the use-enabled/disabled information stored in the nonvolatile memory unit, when an electromagnetic wave arrives externally; and performing magnetic field communication by way of the processing unit in a case in which the use thereof is enabled as a result of the step of referring, and not performing magnetic field communication by the processing unit in a case in which the use thereof is disabled as a result of the step of referring.

Moreover, it is preferable that the use-enabled/disabled control method of the portable communication terminal further includes a step of storing, in an information storage unit of volatile type, information that is the same as the use-enabled/disabled information stored in the nonvolatile memory unit, and it is preferable that the predetermined information is the use-enabled/disabled information stored in the information storage unit.

In addition, it is preferable that the use-enabled/disabled control method of the portable communication terminal further includes a step of copying the use-enabled/disabled information, which is stored in the nonvolatile memory unit, into the information storage unit of volatile type, in a case in which a main power supply of the device is turned off or a reset occurs.

EFFECTS OF THE INVENTION

According to the present invention, it is possible to provide a portable communication terminal that can further improve security performance.

Figure 1:
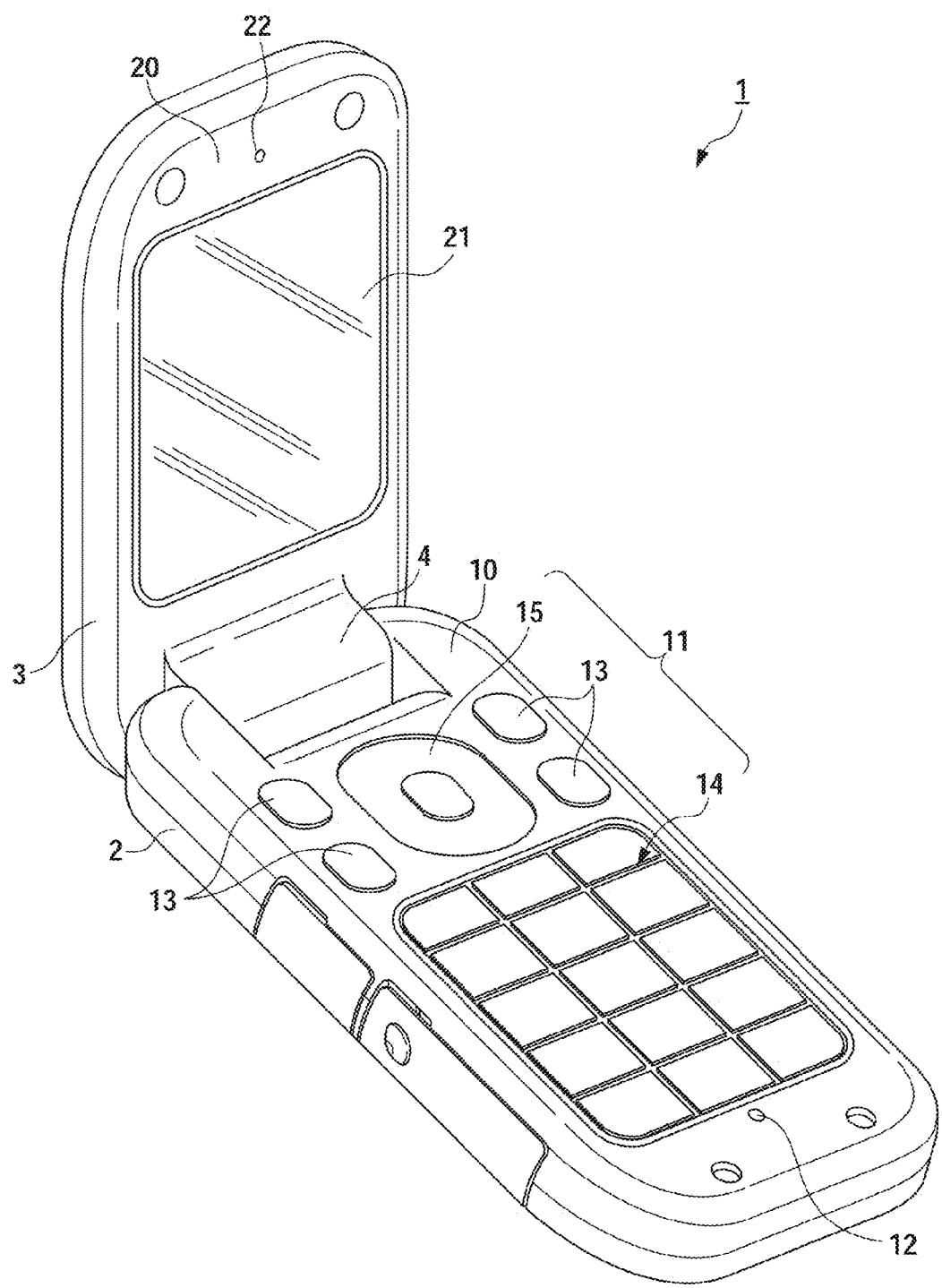
FIG. 1 is a perspective view showing an appearance of a cellular telephone device according to the present invention.

EXPLANATION OF REFERENCE NUMERALS 1 cellular telephone device
2 operation unit side body
3 display unit side body
4 hinge mechanism
11 operation button set
12 sound input unit
21 display
22 sound output unit
40 substrate
51 RFID processing unit
52 RFID chip
53 FF circuit
54 EEPROM
55 CPU I/F
56 interface reset circuit
57 RFID power supply circuit
72 CPU
73 NAND type flash memory
74 sound processing unit
75 image processing unit
76 camera module
77 speaker
78 CPU reset circuit
79 CPU power supply circuit
80 processing unit

PREFERRED MODE FOR CARRYING OUT THE INVENTION

A description is provided hereinafter regarding an embodiment of the present invention.

FIG. 1 is a perspective view showing an appearance of a cellular telephone device 1 as an example of a portable communication terminal according to the present invention. It should be noted that, although FIG. 1 shows a so-called flip-type cellular telephone device, the present invention is not limited thereto. For example, it may be a slider type in which one of the bodies slides to one direction in a state in which the bodies are mutually superimposed; a rotating (turning) type in which one of the bodies is rotated around an axis line along the direction of superimposing the bodies; and a type (straight type) in which an operation unit and a display unit are disposed in one body without having a connecting portion.

The cellular telephone device 1 is configured to include an operation unit side body 2 and a display unit side body 3. The operation unit side body 2 is configured to include on a front face 10 thereof an operation button set 11 and a sound input unit 12 to which sounds, which a user of the cellular telephone device 1 produces during a phone call, are input. The operation button set 11 includes: feature setting operation buttons 13 for operating various settings and various features such as a telephone number directory feature and a mail feature; input operation buttons 14 for inputting digits of a telephone number and characters for mail, and a selection operation button 15 that performs selection of the various operations and scrolling.

The display unit side body 3 is configured to include, on a front face portion 20, a display 21 for displaying a variety of information, and a sound output unit 22 for outputting sound of the other party of the conversation.

In addition, the operation button set 11, the sound input unit 12, the display 21, and the sound output unit 22 described above configure a processing unit 80 to be described later.

An upper end portion of the operation unit side body 2 and a lower end portion of the display unit side body 3 are connected via a hinge mechanism 4. The cellular telephone device 1 can be in a state where the operation unit side body 2 and the display unit side body 3 are apart from each other (opened state), and in a state where the operation unit side body 2 and the display unit side body 3 are contacting each other (folded state), as the operation unit side body 2 and the display unit side body 3, connected via the hinge mechanism 4, pivot with respect to each other.

Figure 2:
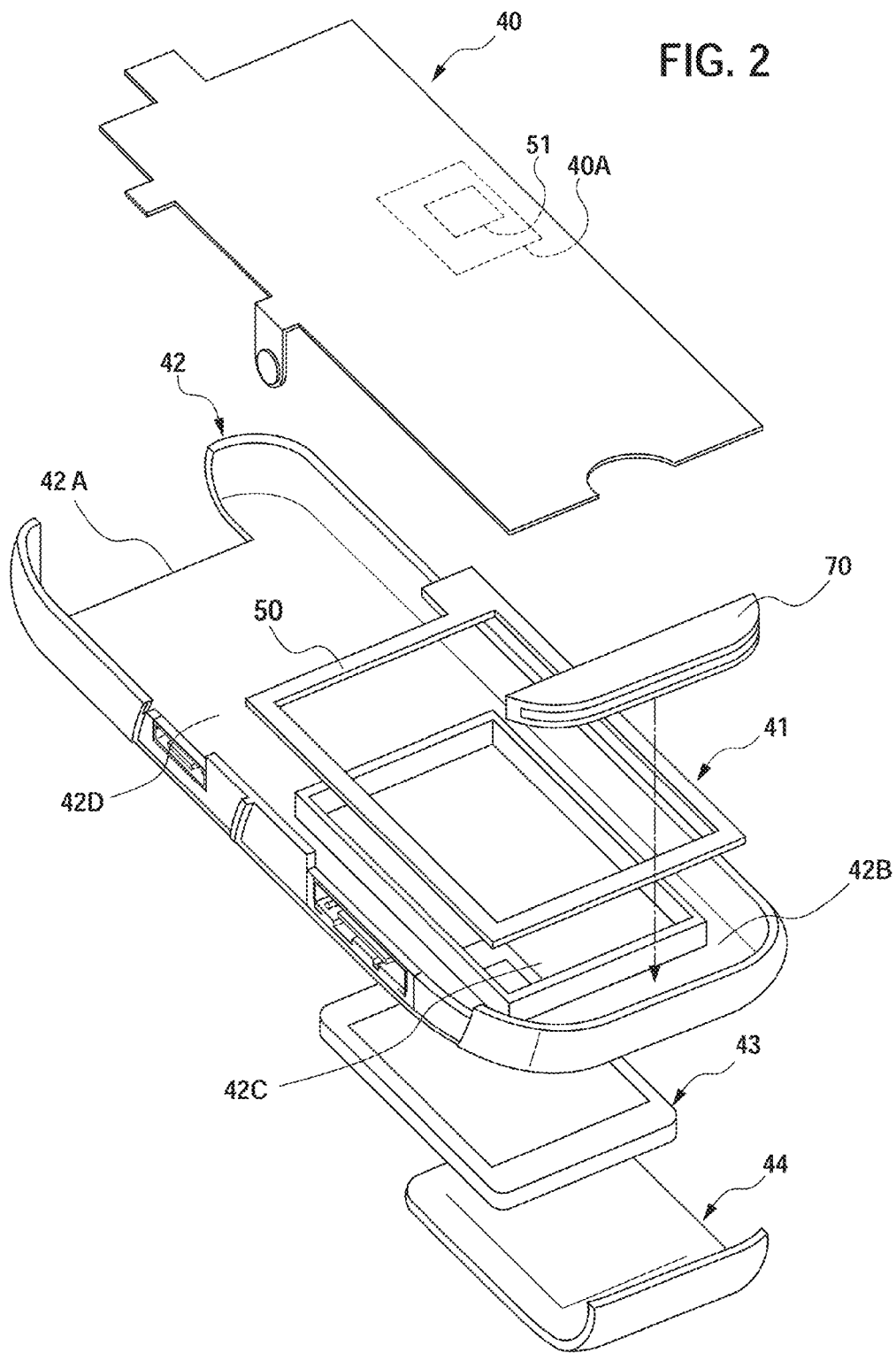
FIG. 2 is a perspective view showing a configuration of an operation unit side body included in the cellular telephone device according to the present invention.

In addition, FIG. 2 is an exploded perspective view of a part of the operating unit side body 2. As shown in FIG. 2, the operating unit side body 2 is configured with a substrate 40, a contactless IC portion (hereinafter referred to as an RFID portion) 41, a rear case portion 42, a battery 43, and a battery cover 44.

The substrate 40 is a so-called motherboard, and a first daughter board 40A on which an RFID processing unit 51 is disposed, and a second daughter board 40B on which a CPU 72 is disposed, which will be described later in detail, are mounted thereon. It should be noted that the first daughter board 40A and the second daughter board 40B are electrically connected with each other by a predetermined connector 100, and are mounted in predetermined positions on the substrate 40. Moreover, the first daughter board 40A is configured to be detachable from the connector 100.

The RFID portion 41 is configured with a magnetic field antenna portion 50 that communicates with an external device by way of a first usable frequency band. Moreover, the RFID processing unit 51, which is disposed in a position different from that of the RFID portion 41, includes a contactless IC chip, and performs processing of information that is communicated by the magnetic field antenna portion 50. It should be noted that the RFID processing unit 51 is disposed on the substrate 40 facing the RFID portion 41 as shown in FIG. 2. In addition, the RFID processing unit 51 is disposed on the first daughter board 40A.

The rear case portion 42 includes: a hinge mechanism fixing portion 42A for fixing the hinge mechanism 4; a main antenna housing portion 42B for housing a main antenna 70 that communicates using a second usable frequency band that is higher than the first usable frequency band; a battery housing portion 42C that houses the battery 43; and an RFID portion fixing portion 42D that fixes the RFID portion 41. It should be noted that the main antenna 70 is described later in detail.

Figure 5:
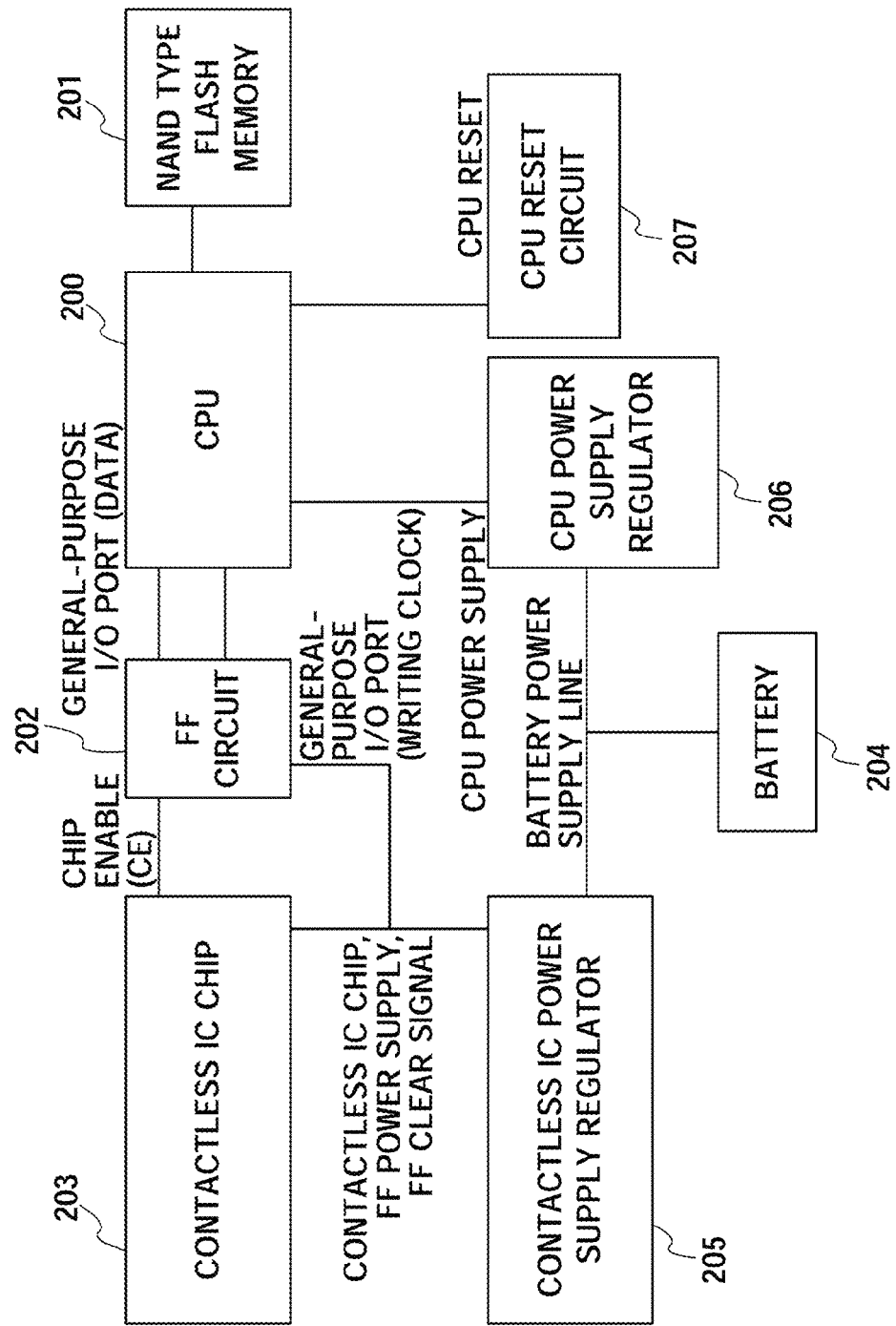
FIG. 5 is a functional block diagram of a circuit that controls activation or inactivation of contactless IC chip functions in the cellular telephone device.

First, a description is provided for setting of activation/inactivation of contactless IC chip functions in the cellular telephone device. FIG. 5 shows a functional block diagram of a circuit that controls activation or inactivation of the contactless IC chip functions in the cellular telephone device. The cellular telephone device includes a CPU 200, an NAND type flash memory 201, an FF (flip flop) circuit 202, a contactless IC chip 203, a battery 204, a contactless IC power supply regulator 205, a CPU power supply regulator 206, and a CPU reset circuit 207. It should be noted that the contactless IC power supply regulator 205 converts a power supply voltage, which is supplied from the battery 204, into a predetermined power supply voltage, and supplies the converted power supply voltage to the contactless IC chip 203. Moreover, the CPU power supply regulator 206 converts a power supply voltage, which is supplied from the battery 204, into a predetermined power supply voltage, and supplies the converted power supply voltage to the CPU 200.

The CPU 200 reads the user's setting information related to activation or inactivation of the functions of the contactless IC chip 203 from the NAND type flash memory 201, which is nonvolatile memory, and causes the FF circuit 202 to store a chip enable signal of the contactless IC chip 203 by way of a GPIO (general-purpose input/output) port or the like.

In a case in which a predetermined signal arrives externally, the contactless IC chip 203 determines to activate or inactivate the functions of the contactless IC chip 203 in accordance with the status of the FF circuit 202.

In addition, these circuits are disposed on the same substrate.

Here, since the FF circuit 202 is volatile, in a case in which the battery 204 is removed from the cellular telephone device, the user's setting information, which indicates activation or inactivation of the functions of the contactless IC chip 203, is lost. In such a case, after the battery 204 is subsequently mounted thereto and the main power supply is turned to an ON state, an operation is required to cause the CPU 200 to read the user's setting information from the NAND type flash memory 201, thereby restoring the setting in the FF circuit 202. Furthermore, as long as this operation is not performed, the user's setting information, which indicates activation or inactivation of the contactless IC chip 203, can not be resumed.

Moreover, even in a case in which the battery 204 is removed from the cellular telephone device, and the battery 204 is mounted again to the cellular telephone device, as long as the operation to turn the main power supply to the ON state is not performed, the CPU 200 can not be activated, and thus the user's setting information cannot be resumed.

In addition, as described above, since the contactless IC chip 203 is disposed on the same substrate on which the CPU 200, the NAND type flash memory 201 and the like are disposed, in a case in which the contactless IC chip 203 is replaced, it is necessary to be careful not to affect the CPU 200 and the like due to heating treatment when removing the contactless IC chip 203 from the substrate, and thus the replacement operation involves some difficulty.

Figure 3:
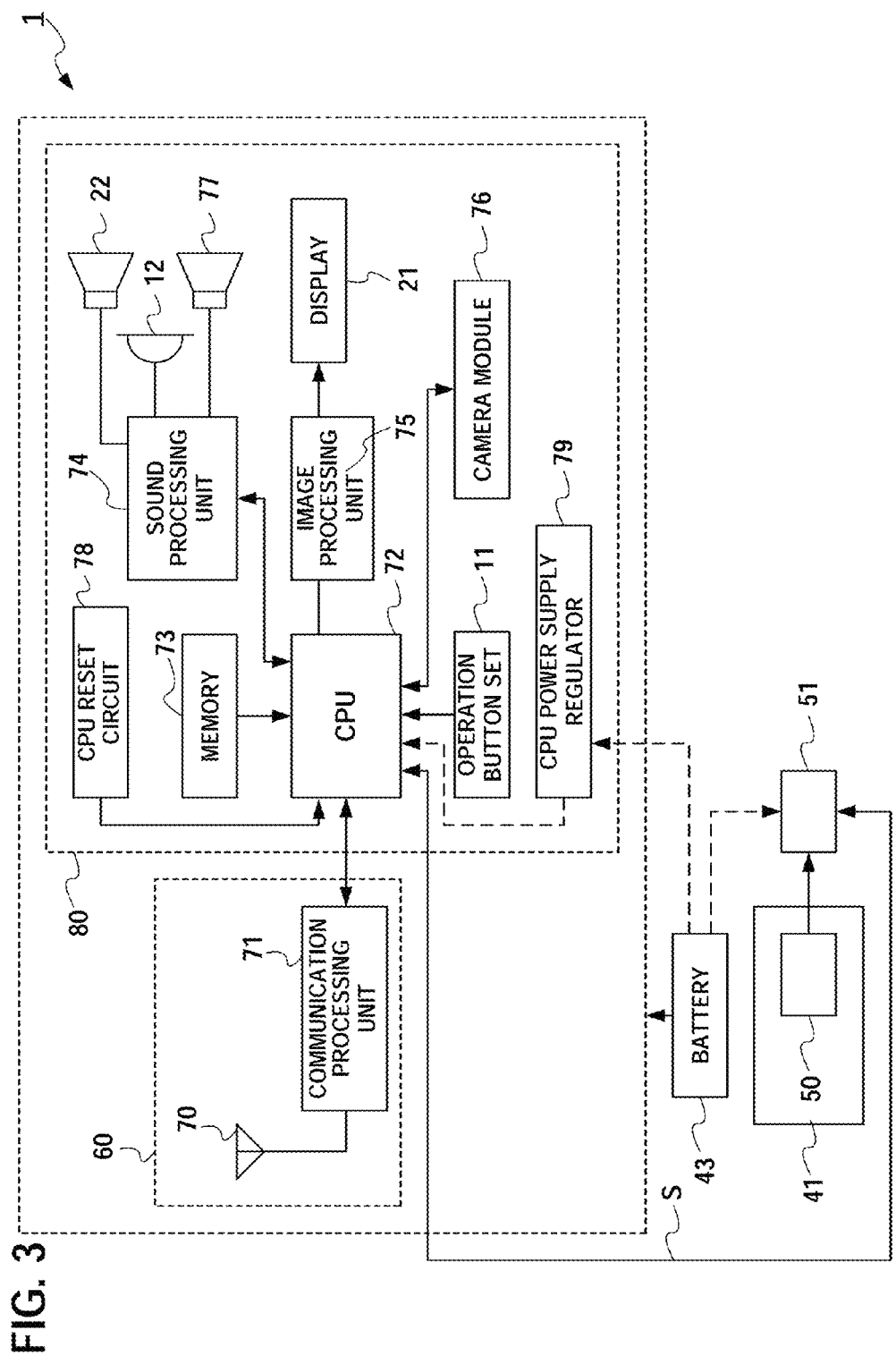
FIG. 3 is a block diagram showing functions of the cellular telephone device according to the present invention.

FIG. 3 is a functional block diagram showing functions of the cellular telephone device 1, which is an example of the portable communication terminal according to the present invention. It should be noted that, in FIG. 3, blocks with the same names as those in FIG. 5 basically have the same functions as such blocks in FIG. 5. As shown in FIG. 3, the cellular telephone device 1 includes: a first communication unit 60 that communicates with external terminals; a processing unit 80 that performs predetermined processing; and the RFID portion 41 that is a second communication unit. Moreover, the RFID portion 41, the first communication unit 60 and the processing unit 80 are supplied with a power supply voltage from the battery 43.

As shown in FIG. 3, the first communication unit 60 includes: the main antenna 70 that communicates with external devices by way of the second usable frequency band; and a communication processing unit 71 (RFID processing unit) that performs signal processing such as modulation processing or demodulation processing.

The main antenna 70 communicates with external devices by way of the second usable frequency band (for example, 800 MHz). It should be noted that, although the second usable frequency band is set to 800 MHz in the present embodiment, other frequency bands can also be used. In addition, the main antenna 70 can be configured as a so-called dual band compatible antenna that can correspond in another usable frequency band (for example, 2 GHz) in addition to the second usable frequency band.

The communication processing unit 71 performs demodulation processing of a signal received by the main antenna 70, transmits the processed signal to the processing unit 80, performs modulation processing of a signal received from the processing unit 80, and transmits the processed signal to an external device via the main antenna 70.

The communication processing unit 71 can be connected to a communication network via a base station. More specifically, the communication processing unit 71 can be connected to an electronic money server (not shown), and can transmit and receive information of electronic money that can be used by the RFID processing unit 51.

The electronic money server is connected in a wired or wireless manner to a read/write device with which the RFID processing unit 51 communicates. Moreover, when bill payment or the like occurs by way of the RFID processing unit 51, the read/write device notifies the electronic money server of the charging, identifies the user of the cellular telephone device having this RFID processing unit 51, and performs the charging from the electronic money possessed by the corresponding user. It should be noted that the RFID processing unit 51 also always keeps money amount information that is the same as the charged electronic money information, and the user can also confirm an amount of a balance and the like by a predetermined operation.

In addition, the communication processing unit 71 can be connected to such an electronic money server, and can perform charge processing of electronic money and the like.

Furthermore, as shown in FIG. 3, the processing unit 80 includes the operation button set 11, the sound input unit 12, the display 21, the sound output unit 22, the CPU 72, the NAND type flash memory 73, a sound processing unit 74, an image processing unit 75, a camera module 76, a speaker 77, a CPU reset circuit 78, and a CPU power supply regulator (hereinafter referred to as a CPU power supply circuit) 79.

The NAND type flash memory 73 stores, as predetermined data, adjustment parameters for the magnetic field antenna portion 50, and the user's setting information such as, for example, use-enabled/disabled information of the RFID chip 52. It should be noted that the adjustment parameters are information written at the time of factory shipment.

The CPU reset circuit 78 outputs a reset signal to the CPU 72 and to an interface reset circuit 56 disposed on the second daughter board 40B.

Here, operations of the CPU reset circuit 78 are described. When the main power supply (POWER) is turned to the ON state, it is necessary that the power supply voltage supplied to the CPU 72 is normally started, and furthermore the CPU 72 is kept in a reset state until the peripheral circuits reach a stable state. Moreover, when the power supply voltage is turned to the OFF state, it is necessary to instantly cause the CPU 72 and peripheral logic to resume the initial state.

The CPU reset circuit 78 performs operations such as securely booting the CPU 72 from the initial state or instantly resuming the initial state, in a case in which the power supply voltage is in the ON or OFF state, or at the time of instantaneous power failure.

The CPU power supply circuit 79 converts a power supply voltage, which is supplied from the battery 43, into a predetermined power voltage, and supplies the converted power supply voltage to the CPU 72.

The CPU 72 performs predetermined control for the display 21, the sound processing unit 74, the image processing unit 75, and the camera module 76. In addition, in a case in which information processed by the RFID processing unit 51 is transmitted to the image processing unit 75 via a signal line S, the CPU 72 performs control such that information processed by the image processing unit 75 is displayed on the display 21.

Furthermore, the RFID portion 41 includes the magnetic field antenna portion 50 that communicates with external devices by way of the first usable frequency band (for example, 13.56 MHz), and is connected to the RFID processing unit 51.

The magnetic field antenna portion 50 is a magnetic field antenna configured with a coil wound in a spiral a plurality of times on a sheet made of PET (polyethylene terephthalate) material, and transmits and receives a signal of the first usable frequency band to and from external devices.

Figure 4:
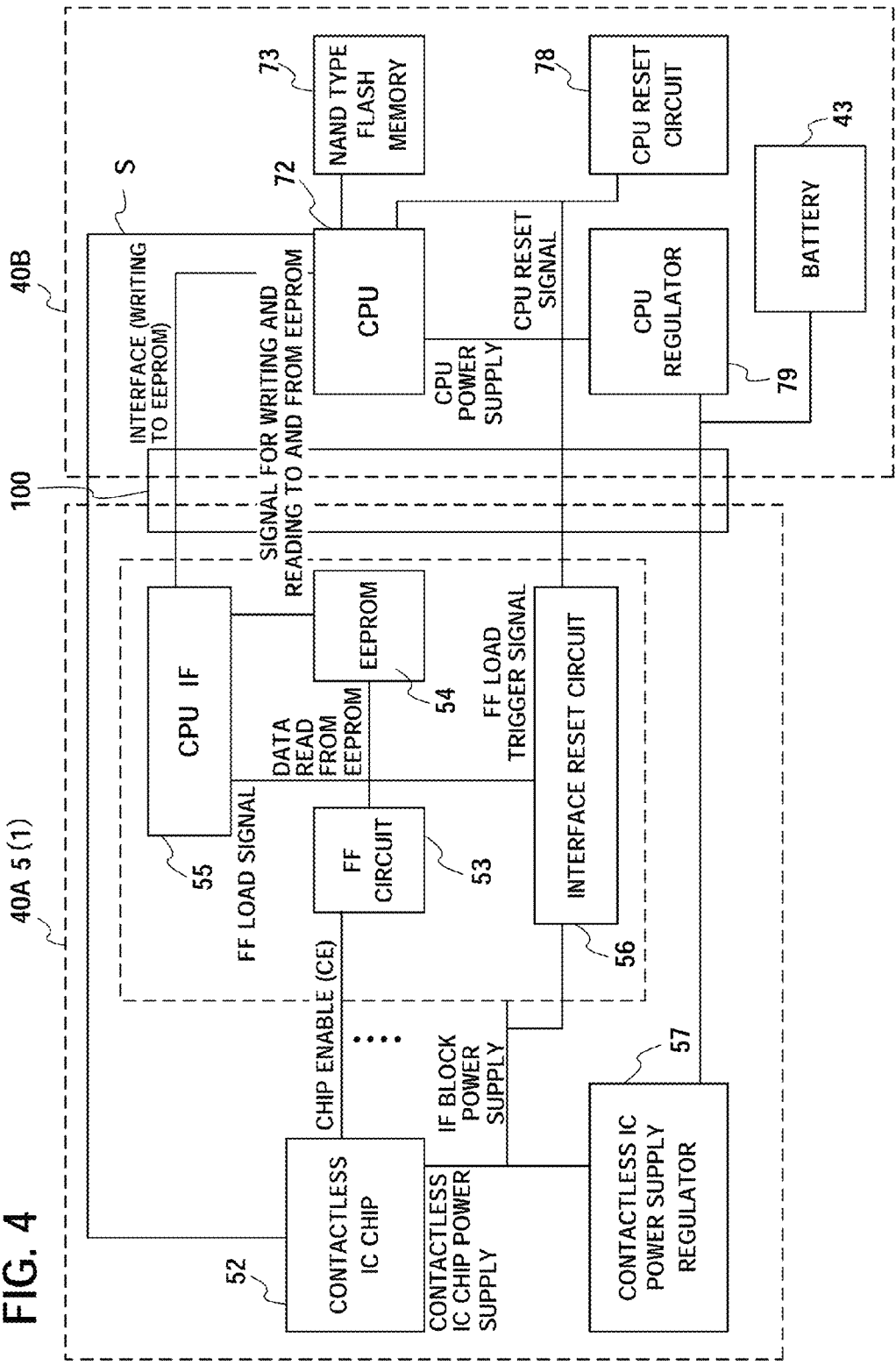
FIG. 4 is a block diagram showing functions of an RFID processing unit and the like disposed on a substrate.

Moreover, the RFID processing unit 51 is disposed on the first daughter board 40A that is mounted in a predetermined position on the substrate 40 and, as shown in FIG. 4, includes a contactless IC chip (hereinafter referred to as an RFID chip) 52 (processing unit), a flip flop (hereinafter referred to as an FF) circuit (information storage unit) 53, EEPROM (Erasable Programmable Read Only Memory) 54, a CPU interface (hereinafter referred to as a CPU I/F) 55, the interface reset circuit 56, and a contactless IC power supply regulator (hereinafter referred to as an RFID power supply circuit) 57. In addition, use-enabled/disabled information is set by the user performing a predetermined operation to the operation button set 11.

The RFID chip 52 performs predetermined processing in accordance with a signal transmitted from the magnetic field antenna portion 50.

The FF circuit 53 is connected to the EEPROM 54, the CPU I/F 55 and the interface reset circuit 56, and stores use-enabled/disabled information that indicates whether the use of the RFID chip 52 is active or inactive, and adjustment parameters for the magnetic field antenna portion 50. Furthermore, information to be stored in the FF circuit 53 is copied from the information stored in the EEPROM 54, the details of which will be later described.

Here, a connection relationship and specific operations of the RFID chip 52 and the FF circuit 53 are described. The RFID chip 52 and the FF circuit 53 are connected to each other via a plurality of signal lines, and an operation of the RFID chip 52 is appropriately switched based on a chip enable (CE) signal that is output from the FF circuit 53. Moreover, "High" (for example, use of the RFID processing unit 51 is enabled) or "Low" (for example, use of the RFID processing unit 51 not enabled) is set to the FF circuit 53 in accordance with the use-enabled/disabled information.

Therefore, in a case in which a first terminal of the FF circuit 53 is "High" (i.e. a case in which the chip enable signal is "High"), the RFID chip 52 performs predetermined processing in accordance with a signal arriving externally (a signal received by the magnetic field antenna portion 50). On the other hand, in a case in which the first terminal of the FF circuit 53 is "Low" (i.e. a case in which the chip enable signal is "Low"), the RFID chip 52 does not perform predetermined processing even if a signal comes from outside.

In addition, adjustment parameters for the magnetic field antenna portion 50 are set to the FF circuit 53 by way of the other ports. Therefore, predetermined adjustment (tuning) is performed for the magnetic field antenna portion 50 in accordance with a setting state of the other ports of the FF circuit 53. By way of this adjustment, electromagnetic waves of the first usable frequency band arriving externally and a signal having the electromagnetic waves as carrier waves are preferably provided to the RFID chip 52 via the magnetic field antenna portion 50.

The EEPROM 54 is connected to the FF circuit 53 and the CPU I/F 55, and stores use-enabled/disabled information and adjustment parameters. Furthermore, information to be stored in the EEPROM 55 is copied from the information stored in the NAND type flash memory 73, the details of which will be later described.

The CPU I/F 55 writes and reads information to and from the EEPROM 54, and writes information to the FF circuit 53, in accordance with the control by the CPU 72 and the interface reset circuit 56. It should be noted that the CPU I/F 55 and the CPU 72 are connected to each other via the connector 100 by way of an interface conforming with a predetermined standard.

The RFID power supply circuit 57 converts a power supply voltage, which is supplied from the battery 43, into a predetermined power voltage, and supplies the converted power supply voltage to the RFID chip 52, the interface reset circuit 56 and the like.

Moreover, the CPU 72, the NAND type flash memory 73, the CPU reset circuit 78 and the CPU power supply circuit 79 are disposed on the second daughter board 40B, which is different from the first daughter board 40A on which the RFID processing unit 51 is disposed.

Here, operations of the CPU 72 are explained.

In response to a predetermined operation of the operation button set 11 by the user, in a case in which updating of the use-enabled/disabled information is requested (a case in which the setting for enabling the RFID processing unit 51 (activated setting) is changed to the setting for disabling it (inactivated setting), or a case in which the inactivated setting of the RFID processing unit 51 is changed to the activated setting), the CPU 72 writes (updates) the use-enabled/disabled information into the NAND type flash memory 73 at first. Thereafter, the CPU 72 reads the use-enabled/disabled information from the NAND type flash memory 73, and writes (updates) the use-enabled/disabled information into the FF circuit 53 and the EEPROM 54.

As a specific procedure, in a case in which updating of the use-enabled/disabled information is requested, the CPU 72 updates the use-enabled/disabled information in the NAND type flash memory 73. Thereafter, the CPU 72 reads the use-enabled/disabled information and the previously stored adjustment parameters from the NAND type flash memory 73, and carries out copying thereof into the FF circuit 53 and the EEPROM 54 by way of the CPU I/F 55.

Moreover, in a case in which a reset signal is transmitted from the CPU reset circuit 78, the CPU 72 reads the use-enabled/disabled information and the adjustment parameters from the NAND type flash memory 73, and carries out copying thereof into the FF circuit 53 and the EEPROM 54 by way of the CPU I/F 55. It should be noted that a reset signal is generated from the CPU 72 by interruption in a case in which the main power supply transitions from the OFF state to the ON state, in a case in which the battery 43 is forcibly removed or inserted when the main power supply is in the ON state, or in a case in which a reset button for forced reset is depressed, or the like.

Next, operations of the RFID portion 41 are described.

The magnetic field antenna portion 50, when approaching within a predetermined distance to a read/write device disposed outside thereof, receives electromagnetic waves transmitted from the read/write device (modulated by a carrier frequency having the first usable frequency band (for example, 13.56 MHz)).

A more specific description is provided hereinafter. When the magnetic field antenna portion 50 receives electromagnetic waves, an induced electromotive force is generated due to a coil effect from the electromagnetic waves. With this induced electromotive force as a trigger, the contactless IC chip 52 is activated, and the subsequent confirmation processing is performed.

In a case in which the RFID chip 52 receives predetermined electromagnetic waves by way of the magnetic field antenna portion 50, the RFID chip 52 refers to the FF circuit 53, confirms the user's use-enabled/disabled information, and performs active or inactive determination. After referring to the FF circuit 53, in a case in which the RFID chip 52 determines that it is active, a predetermined operation is performed; on the other hand, in a case in which the RFID chip 52 determines that it is inactive, the predetermined operation is not performed.

In this way, the cellular telephone device 1 according to the present invention has the EEPROM 54 that is nonvolatile memory on the first daughter board 40A, and holds information (the user's use-enabled/disabled information and the like) that is the same as that held by the FF circuit 53. Therefore, the user's use-enabled/disabled information is not lost even after the battery 43 is removed. Moreover, every time the battery 43 is removed and then mounted again, the cellular telephone device 1 according to the present invention performs processing in which the user's use-enabled/disabled information and the like are first read from the EEPROM 54, and thereafter the read use-enabled/disabled information and the like are written into the FF circuit 53. Therefore, even if the main power supply is in the OFF state, active or inactive determination is possible by way of the RFID chip 52, based on the user's use-enabled/disabled information.

In addition, the cellular telephone device 1 according to the present invention has a configuration in which the EEPROM 54 is provided on the first daughter board 40A, and the information stored in the EEPROM 54 is copied into the FF circuit 53. Therefore, it is not necessary to dispose the CPU 72 and the FF circuit 53 within a short distance, and the electronic components can be freely disposed on the substrate 40.

Furthermore, in the cellular telephone device 1 according to the present invention, the board (the first daughter board 40A) on which the RFID chip 52 is disposed and the board (the second daughter board 40B) on which the CPU 72 is disposed are connected to each other via the connector 100 on the substrate 40, and the first daughter board 40A is configured to be detachable from the connector 100. Therefore, the RFID chip 52 can be easily replaced without affecting the CPU 72 and the like.

Moreover, the cellular telephone device 1 according to the present invention is configured such that, every time the main power supply enters the ON state or the like, and a reset signal is generated, operations are performed in which the user's use-enabled/disabled information and the adjustment parameters are first read from the NAND type flash memory 73 disposed on the second daughter board 40B, and thereafter the user's use-enabled/disabled information and the adjustment parameters are copied into the EEPROM 54 and the FF circuit 53. Therefore, in a case in which the RFID chip 52 is replaced, for example, an initialization operation can be performed without involving special software processing.

In addition, the cellular telephone device 1 according to the present invention reads the user's use-enabled/disabled information and the adjustment parameters from the NAND type flash memory 73, and copies them into the EEPROM 54 and the FF circuit 53. Therefore, in a case in which the user's use-enabled/disabled information is updated, it is not necessary to perform processing such as reading the adjustment parameters once from the EEPROM 54, figuring out the logical sum of activated bits or inactivated bits of the RFID chip 52, and thereafter writing the result into the EEPROM 54 again.

The invention claimed is:

1. A portable communication terminal, comprising:
   a processing unit that performs magnetic field communication based on a signal arriving from an external device, in a case in which the portable communication terminal approaches within a distance to the external device;
   a nonvolatile memory unit comprising a first memory and a second memory, wherein both the first memory and the second memory store use-enabled/disabled information indicating whether use of the processing unit is enabled;
   an information storage unit of volatile type that stores information that is the same as the use-enabled/disabled information stored in the nonvolatile memory unit; and
   a control unit that performs updating of the use-enabled/disabled information,
   wherein, when a signal arrives from the external device, the processing unit determines whether to perform predetermined processing, according to predetermined information based on the use-enabled/disabled information stored in the nonvolatile memory unit, wherein, when a request to change whether to enable use of the processing unit is performed, the control unit updates the use-enabled/disabled information stored in the first memory, the second memory, and the information storage unit, and wherein, in a case of a reset occurring, the control unit copies the use-enabled/disabled information, which is stored in the first memory, into the second memory and the information storage unit.

2. The portable communication terminal according to claim 1, wherein the predetermined information is the use-enabled/disabled information stored in the information storage unit.

3. The portable communication terminal according to claim 1, further comprising a magnetic field antenna for performing magnetic field communication, wherein the magnetic field antenna is connected to the processing unit, and wherein, when receiving predetermined electromagnetic waves, the magnetic field antenna generates an induced electromotive force that serves as a trigger to start the processing unit.

4. The portable communication terminal according to claim 3, wherein the processing unit performs settlement processing of electronic money by way of magnetic field communication.

5. The portable communication terminal according to claim 1, further comprising a battery that supplies driving electric power to each of the processing unit and the control unit, wherein the driving electric power can be supplied from the battery to the processing unit even if power supply to the control unit is turned off.

6. The portable communication terminal according to claim 5, wherein, when the power supply transitions from being turned off to being turned on, the control unit copies the use-enabled/disabled information, which is stored in the nonvolatile memory unit, into the information storage unit.

7. The portable communication terminal according to claim 5, further comprising:
a first substrate on which the control unit is mounted; and
a second substrate on which the processing unit is mounted.

8. The portable communication terminal according to claim 7, wherein the first memory is disposed on the first substrate, and wherein the second memory is disposed on the second substrate.

9. The portable communication terminal according to claim 1, further comprising a magnetic field antenna for performing magnetic field communication that is connected to the processing unit, wherein adjustment parameters of the magnetic field antenna are further stored in the first memory, and wherein, when a request to change whether to enable use of the processing unit is performed, the control unit updates the use-enabled/disabled information stored in the first memory, and reads the use-enabled/disabled information updated in the first memory and the adjustment parameters, and writes both into the second memory.

10. A method for use-enabled/disabled control in a portable communication terminal that includes a processing unit performing magnetic field communication, the method comprising the steps of:
designating whether to enable use of the processing unit;
storing, in both a first memory and a second memory of a nonvolatile memory unit, use-enabled/disabled information indicating whether use of the processing unit is enabled, based on the step of designating;
storing, in a volatile memory unit, the same use-enabled/disabled information stored in the nonvolatile memory unit;
in response to a request to change whether to enable use of the processing unit, updating the use-enabled/disabled information stored in the first memory, the second memory, and the volatile memory unit;
in response to an occurrence of a reset, copying the use-enabled/disabled information, which is stored in the first memory, into the second memory and the volatile memory unit;
referring to predetermined information based on the use-enabled/disabled information stored in the nonvolatile memory unit, when an electromagnetic wave arrives from an external device, in a case in which the portable communication terminal approaches within a distance to the external device; and
performing magnetic field communication by way of the processing unit in a case in which the use thereof is enabled as a result of the step of referring, and not performing magnetic field communication by the processing unit in a case in which the use thereof is disabled as a result of the step of referring.

11. The use-enabled/disabled control method according to claim 10, wherein the predetermined information is the use-enabled/disabled information stored in the volatile memory unit.

12. The use-enabled/disabled control method according to claim 10, further comprising copying the use-enabled/disabled information, which is stored in the first memory, into the volatile memory unit, in a case in which a main power supply of the device is turned off.

* * * * *